US005551186A

United States Patent [19]
Harada

[11] Patent Number: 5,551,186
[45] Date of Patent: Sep. 3, 1996

[54] FISH CATCH CHEST

[76] Inventor: Walter S. Harada, 338 Kalama St., Kailua, Hi. 96734

[21] Appl. No.: 374,084

[22] Filed: Jan. 18, 1995

[51] Int. Cl.⁶ ................................................. A01K 97/00
[52] U.S. Cl. .............................. 43/55; 220/560; 224/920
[58] Field of Search ............................ 43/55; 220/571, 220/560, 505, 555, 529; 206/315.11; 224/920, 184, 406, 572

[56] References Cited

U.S. PATENT DOCUMENTS

| | | | |
|---|---|---|---|
| 2,811,276 | 10/1957 | Ray | 43/54.1 X |
| 4,070,786 | 1/1978 | Dunham | 43/55 |
| 4,297,804 | 11/1981 | Weld | 43/55 |
| 4,638,593 | 1/1987 | Garcia | 43/54.1 |
| 4,927,041 | 5/1990 | Hepburn | 43/54.1 X |
| 4,996,790 | 3/1991 | Ruggles | 43/54.1 X |
| 5,050,335 | 9/1991 | Hisey | 43/55 |
| 5,305,544 | 4/1994 | Testa, Jr. | 43/54.1 |

Primary Examiner—J. Elpel
Attorney, Agent, or Firm—Michael I. Kroll

[57] ABSTRACT

A fish catch chest comprising a boat-shaped hull capable of floating upon a top surface of a body of water. A receptacle has an open top with a compartment therein and is integral with the boat-shaped hull. The compartment will hold fish caught by a skin diver in the body of water. A lid is for closing the open top of the receptacle and sealing the compartment.

8 Claims, 2 Drawing Sheets

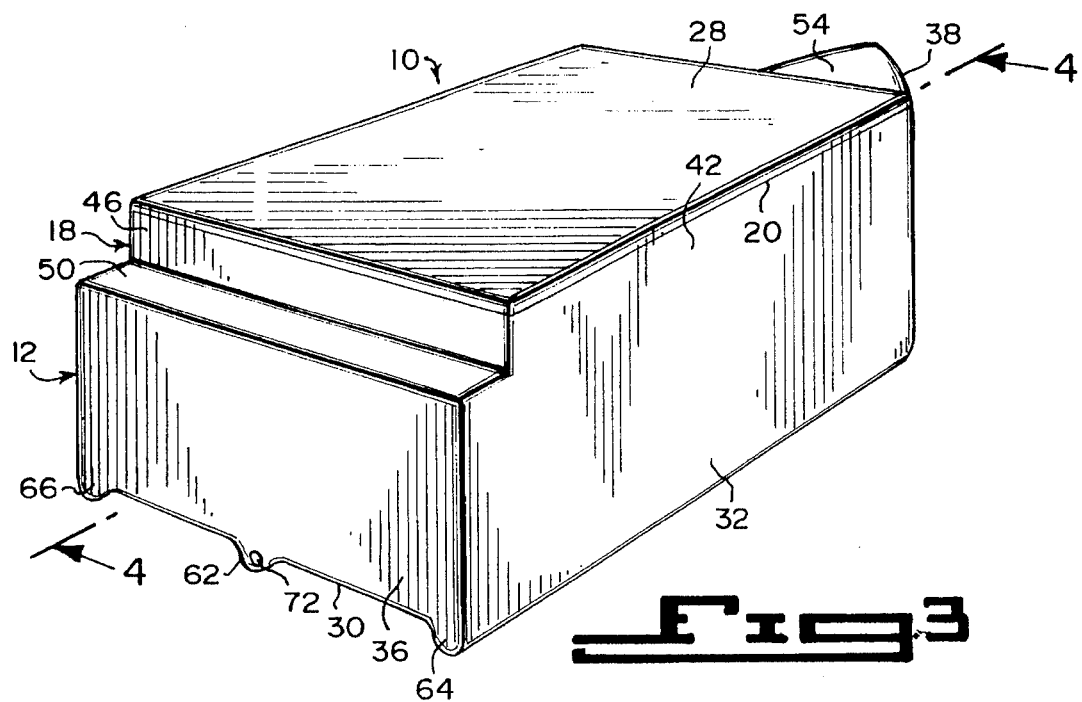
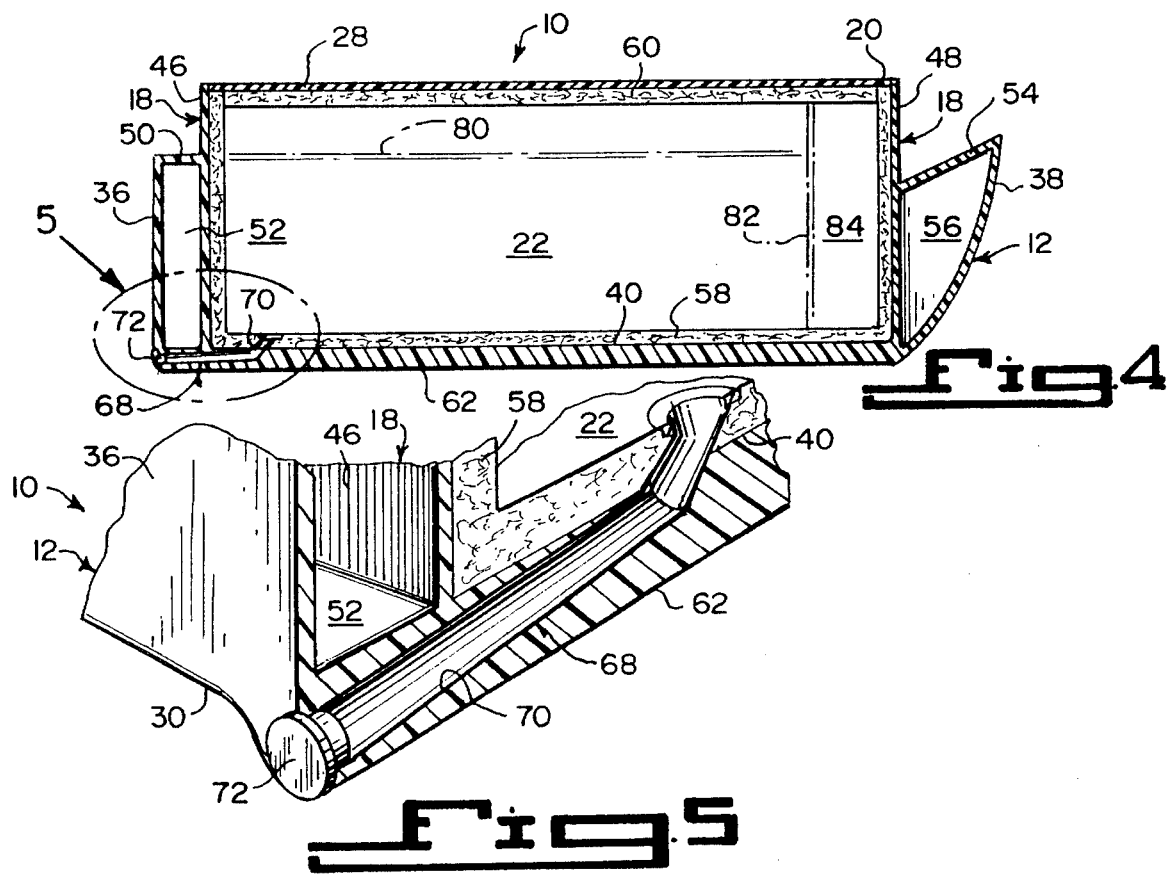

FISH CATCH CHEST

BACKGROUND OF THE INVENTION

1. Field of the Invention

The instant invention relates generally to live bait and fish storing containers and more specifically it relates to a fish catch chest.

2. Description of the Prior Art

Numerous live bait and fish storing containers have been provided in prior art that are adapted to maintain live bait along with fish that are caught on fishing expeditions. For example, U.S. Pat. Nos. 4,070,786 to Dunham; 4,297,804 to Weld; 5,050,335 to Hisey and 5,305,544 to Testa, Jr. all are illustrative of such prior art. While these units may be suitable for the particular purpose to which they address, they would not be as suitable for the purposes of the present invention as heretofore described.

DUNHAM, JAMES M.

FISH RECEIVING HOPPER

U.S. Pat. No. 4,070,786

A fish receiving hopper in cooperation with an ice chest, live well or other fish storage container or vessel. The hopper includes a molded shell adapted to fit on the top of the ice chest, live well, or alternative vessel. The shell carries a downwardly extending chute. A cooperating hinged door is adapted to open when a fish is tossed onto the chute and slides downwardly by the force of gravity to strike the hinged door. The fish storage hopper may be removably fitted to or hinged to the ice chest, live well, or other fish storage vessel.

WELD, DAVID B.

CHUMATE

U.S. Pat. No. 4,297,804

A floating container is specially adapted to hold live bait and is shaped like a small boat, so that it can be pulled behind a fishing vessel without sinking. The container is transparent so that the bait carried therein can be seen and thus attract game fish in the surrounding water. The container is structured to provide proper aeration for the bait, yet allow access to it when needed. Closure doors are positioned to shut independently when the container is being towed.

HISEY, FRANK L.

MINNOW AND FISH PRESERVING CONTAINER

U.S. Pat. No. 5,050,335

A combination minnow and fish preserving container having a first section for containing water and minnows and a second section for containing water and a refrigerant, such as ice, and caught fish. The sections are separated by a thin wall cold conducting partition. The container is formed of insulated structural foam and has a substantially airtight lid portion defining when inverted molds for freezing suitably shaped blocks of ice. The container is use will maintain water and minnows at a temperature below 40 degrees Fahrenheit. The minnows in the first section are subjected to a substantial slowing of metabolism and are able to survive for a period of two weeks due to the insulating efficiency arrangement of the cold conducting partition and the substantially airtight closure. When transported to a fishing location the catch is positioned in the second section where they are suitably refrigerated to maintain freshness for a desirable length of time.

TESTA, JR., VINCENT M.

BAIT STORAGE, COOLER AND TACKLE HOLDER ARRANGEMENT

U.S. Pat. No. 5,305,544

The present invention comprises a multi-compartment insulated chest for the fresh storage of bait and food. The chest has a lower portion which is divided into two compartments by a non-insulated wall. The chest has an upper portion which includes a lid and an upper storage area. The upper lid has a secondary hatch to permit access through the upper portion and directly into the lower bait portion. The upper may be separable from the lower portion and float next to a fisherman connected thereto by a tether.

SUMMARY OF THE INVENTION

A primary object of the present invention is to provide a fish catch chest that will overcome the shortcomings of the prior art devices.

Another object is to provide a fish catch chest that can be tethered to a skin diver in a body of water and will hold fresh fish therein, which was caught in the body of water by the skin diver.

An additional object is to provide a fish catch chest that can contain an optional dry storage compartment which can hold a first aid kit, a tourniquet, a knife, signal flares and other articles therein to be used by the skin diver.

A further object is to provide a fish catch chest that is simple and easy to use.

A still further object is to provide a fish catch chest that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein:

FIG. 3 is an enlarged rear top perspective view of the instant invention taken in the direction of arrow 3 in FIG. 2.

FIG. 4 is a cross sectional view taken along line 4—4 in FIG. 3.

FIG. 5 is a further enlarged cross sectional perspective view of the area indicated by arrow 5 in FIG. 4.

Similar reference characters denote corresponding features consistently throughout the attached drawings.

DETAILED DESCRIPTION OF THE PREFERRED EMBODIMENTS

Figure 1:
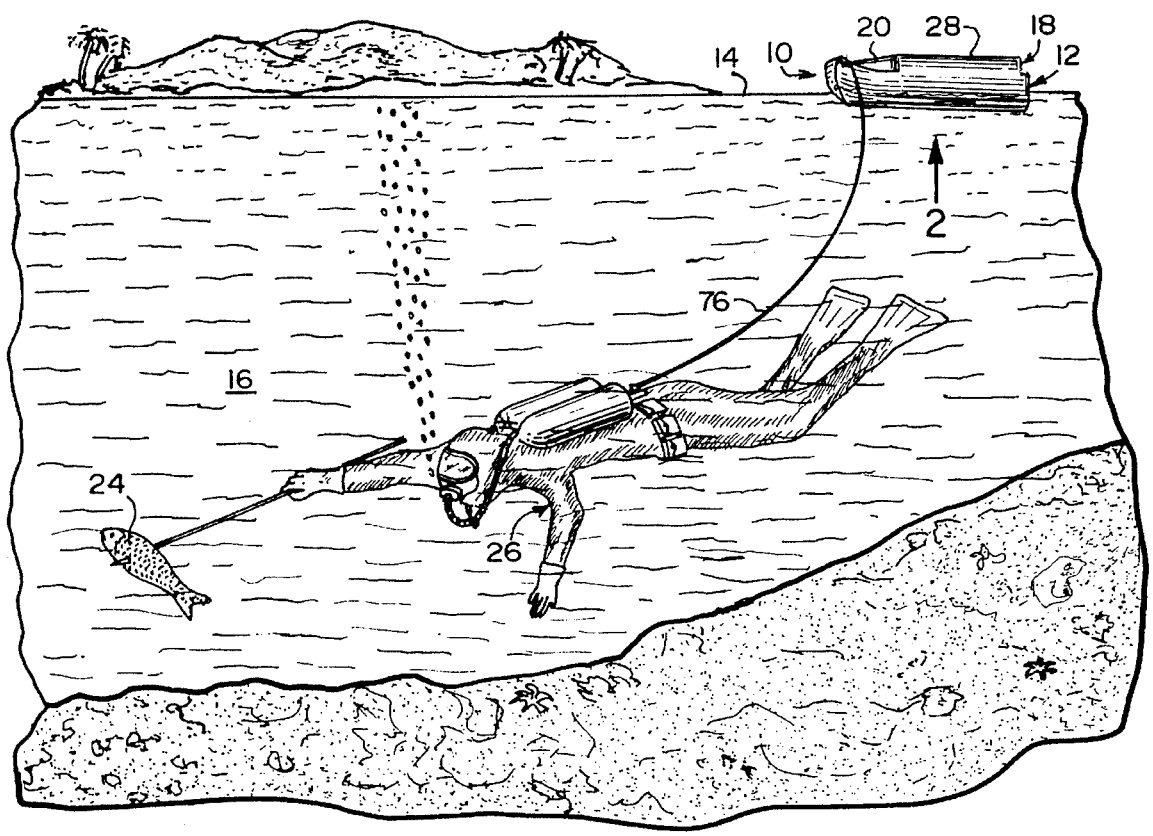
FIG. 1 is a front perspective view showing the instant invention in use with a skin diver in a body of water.
Figure 2:
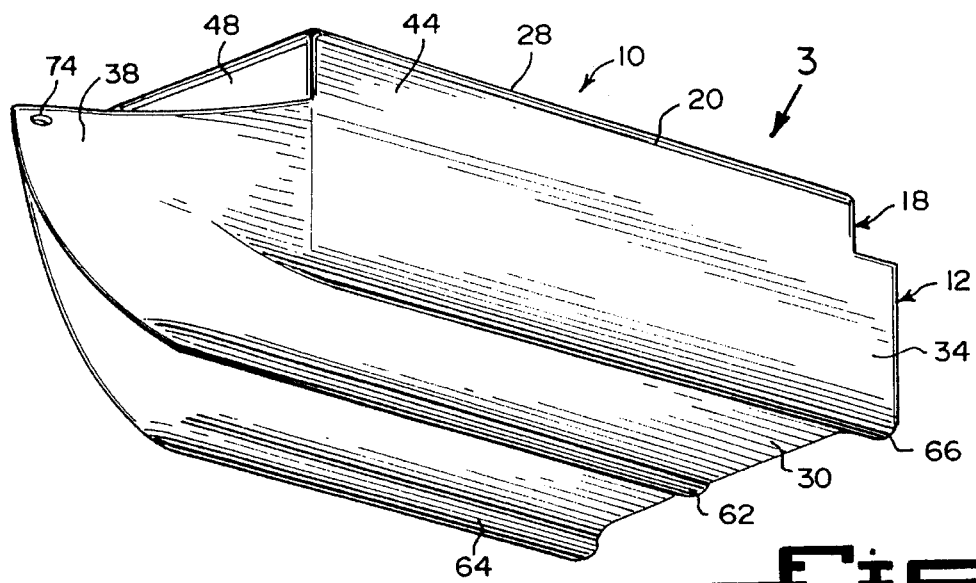
FIG. 2 is an enlarged front bottom perspective view of the instant invention per se taken in the direction of arrow 2 in FIG. 1.

Turning now descriptively to the drawings, in which similar reference characters denote similar elements throughout the several views, FIGS. 1 through 5 illustrate a fish catch chest 10 comprising a boat-shaped hull 12, capable of floating upon a top surface 14 of a body of water 16. A receptacle 18 has an open top 20 with a compartment 22 therein and is integral with the boat-shaped hull 12. The compartment 22 will hold fish 24 caught by a skin diver 26 in the body of water 16. A lid 28 is for closing the open top 20 of the receptacle 18 and sealing the compartment 22.

The boat-shaped hull 12 includes a flat base 30. A starboard side wall 32 extends at a right angle upwardly from the flat base 30. A port side wall 34 extends at a right angle upwardly from the flat base 30. A transom wall 36 extends at a right angle upwardly from the flat base 30. A prow 38 extends outwardly from the flat base 30.

The receptacle 18 contains a flat bottom wall 40 integral with the flat base 30. A rear wall 46 is spaced behind the transom wall 36. A front wall 48 is spaced behind the prow 38.

A horizontal aft deck 50 is between the transom wall 36 and the rear wall 46, thereby forming a rear sealed chamber 52 therein, to assist in keeping the boat-shaped hull 12 afloat on the top surface 14 of the body of water 16. An inclined fore deck 54 is between the prow 38 and the front wall 48 thereby forming a front sealed chamber 56 therein, to assist in keeping the boat-shaped hull 12 afloat on the top surface 14 of the body of water 16.

As shown in FIGS. 4 and 5, a first insulating liner 58 is affixed against an inner surface of the flat bottom wall 40, the first end wall 32, the second end wall 34, the rear wall 46 and the front wall 48 of the receptacle 18. A second insulating liner 60 is affixed against an inner surface of the lid 28, to keep the fish 24 fresh within the receptacle 18.

Three stabilizer ribs 62, 64, 66 are formed on another surface of the flat base 30. The first stabilizer rib 62 runs longitudinally along the center of the flat base 30. The second stabilizer rib 64 runs longitudinally along the starboard side of the flat base 30. The third stabilizer rib 66 runs longitudinally along the port side of the flat base 30, to help prevent the boat-shaped hull 12 and the receptacle 18 from capsizing in the body of water 16.

The fish catch chest 10, as best seen in FIG. 5, further includes a structure 68 for draining water out of the receptacle 18. The water draining structure 68 consists of the first stabilizer rib 62 having an aft drainage channel 70 with a plug 72 to close the drainage channel 70.

The prow 38 has an aperture 74 therethrough, so that an elongated tether line 76 can be connected between the boat-shaped hull 12 and the skin diver 16. The boat-shaped hull 12, the receptacle 18 and the lid 28 are all fabricated out of a hard plastic material 78.

The receptacle 18 can further include a removable longitudinal partition 80, shown in phantom in FIG. 4, for dividing the compartment 22 into two segments for holding and separating different types of fish 24 and other sea creatures therein. The receptacle 18 can also contain a latitudinal partition 82, shown in phantom in FIG. 4, to form an optional dry storage compartment 84, for holding a first aid kit, a tourniquet, a knife, signal flares and other articles, so as to be used by the skin diver 26.

LIST OF REFERENCE NUMBERS 10 fish catch chest
12 boat-shaped hull
14 top surface of 16
16 body of water
18 receptacle
20 open top of 18
22 compartment in 18
24 fish
26 skin diver
28 lid
30 flat base of 12
32 starboard side wall of 12
34 port side wall of 12
36 transom wall of 12
38 prow of 12
40 flat bottom wall of 18
42 first end wall of 18
44 second end wall of 18
46 rear wall of 18
48 front wall of 18
50 horizontal aft deck
52 rear sealed chamber
54 inclined fore deck
56 front sealed chamber
58 first insulating liner on 40, 42, 44, 46 and 48
60 second insulating liner on 28
62 first stabilizer rib on 30
64 second stabilizer rib on 30
66 third stabilizer rib on 30
68 water draining structure
70 drainage channel in 62
72 plug for 70
74 aperture in 38
76 elongated tether line
78 hard plastic material for 12, 18 and 28
80 removable longitudinal partition in 18
82 latitudinal partition in 18
84 dry storage compartment It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A fish catch chest comprising:
   a) a boat-shaped hull capable of floating upon a top surface of a body of water comprising a flat base, a starboard side wall extending at a right angle upwardly from said flat base, a port side wall extending at a right angle upwardly from said flat base, a rear wall extending up from said flat base, a transom wall extending at a right angle upwardly from said flat base to the rear of said rear wall, a front wall extending up from said flat base, and a prow extending outwardly from said flat base in front of said front wall;
   b) a receptacle having an open top with a compartment therein and being integral with and formed by the walls of said boat-shaped hull, so that the compartment will hold fish caught by a skin·diver in the body of water; and
   c) a lid for closing the open top of said receptacle and sealing the compartment;
   d) a horizontal aft deck between said transom wall and said rear wall forming a rear sealed chamber and a inclined fore deck between said prow and said front wall forming a front sealed chamber, said sealed chambers assisting in keeping said hull afloat on the top surface of the body of water; and
   e) a first insulating liner affixed against an inner surface of said flat bottom wall, said port and sideboard side walls, and said front and rear of said hull, and a second insulating liner affixed against an inner surface of said lid to keep the fish fresh within said receptacle.

2. A fish catch chest as recited in claim 1, further including three stabilizer ribs formed on an outer surface of said flat base, in which said first stabilizer rib runs longitudinally along the center of said flat base, said second stabilizer rib runs longitudinally along the starboard side of said flat base and said third stabilizer rib runs longitudinally along the port side of said flat base to help prevent said boat-shaped hull and said receptacle from capsizing in the body of water.

3. A fish catch chest as recited in claim 2, further including means for draining water out of said receptacle.

4. A fish catch chest as recited in claim 3, wherein said water draining means includes:
   a) said first stabilizer rib having an aft drainage channel therein; and
   b) a plug to close said drainage channel.

5. A fish catch chest as recited in claim 4, wherein said prow has an aperture therethrough so that an elongated tether line can be connected between said boat-shaped hull and the skin diver.

6. A fish catch chest as recited in claim 5, wherein said boat-shaped hull, said receptacle and said lid are all fabricated out of a hard plastic material.

7. A fish catch chest as recited in claim 6, wherein said receptacle further includes a removable longitudinal partition for dividing the compartment into two segments for holding and separating different types of fish and other sea creatures therein.

8. A fish catch chest as recited in claim 7, wherein said receptacle further includes a latitudinal partition to form an optional dry storage compartment for holding a first aid kit, a tourniquet, a knife, signal flares and other articles, to be used by the skin diver.

* * * * *